(12) United States Patent
Van Goor

(10) Patent No.: US 10,690,132 B2
(45) Date of Patent: Jun. 23, 2020

(54) LIQUID CHROMATOGRAPHY PUMP HAVING DIVERSION CONDUIT FOR AIR EVACUATION

(71) Applicant: Spark Holland B.V., Emmen (NL)

(72) Inventor: Richard Charles Van Goor, Emmen (NL)

(73) Assignee: SPARK HOLLAND B.V., Emmen (NL)

(*) Notice: Subject to any disclaimer, the term of this patent is extended or adjusted under 35 U.S.C. 154(b) by 208 days.

(21) Appl. No.: 15/825,458

(22) Filed: Nov. 29, 2017

(65) Prior Publication Data
US 2018/0147519 A1    May 31, 2018

(30) Foreign Application Priority Data

Nov. 29, 2016  (EP) .................................... 16201217

(51) Int. Cl.
*F04B 53/16*  (2006.01)
*F04B 53/02*  (2006.01)
(Continued)

(52) U.S. Cl.
CPC ............... *F04B 53/16* (2013.01); *F04B 7/00* (2013.01); *F04B 19/22* (2013.01); *F04B 23/06* (2013.01);
(Continued)

(58) Field of Classification Search
CPC .. F04B 53/06; F04B 53/02; F04B 7/00; F04B 7/0208; F04B 7/0266; F04B 19/22; F04B 19/04; F04B 53/007; F04D 9/04
See application file for complete search history.

(56) References Cited

U.S. PATENT DOCUMENTS 3,810,716 A * 5/1974 Abrahams ........... F04B 53/1002
                                                    417/313
3,838,943 A * 10/1974 Ulbing ..................... F01M 3/02
                                                    417/289
(Continued)

FOREIGN PATENT DOCUMENTS

EP         0606980 A2      7/1994
EP         0606980 A3      7/1994
(Continued)

OTHER PUBLICATIONS

Extended European Search Report EP Application No. 16201217.3 dated May 8, 2017.

*Primary Examiner* — Bryan M Lettman
*Assistant Examiner* — Timothy P Solak
(74) *Attorney, Agent, or Firm* — Pillsbury Winthrop Shaw Pittman, LLP

(57) ABSTRACT

A high or ultra high performance liquid chromatography pump has a plunger rod extending in an axial direction into a pump chamber through a plunger passage. The plunger rod is reciprocally movable in the axial direction into the pump chamber and back. An outlet channel extends through the pump head between an outlet port and the pump chamber and an inlet channel extends through the pump head between an inlet port and the pump chamber. The pump head has a pump head block and a pressure sensor body. A tubular portion of the pump head block projects into the pressure sensor body. The outlet channel has at least one diversion conduit portion at least partially bounded by the tubular portion of the pump head block, the diversion conduit portion of the outlet channel extending from said pump chamber in said axial direction.

17 Claims, 3 Drawing Sheets

(51) Int. Cl.
*F04B 7/00* (2006.01)
*F04B 53/06* (2006.01)
*F04B 53/00* (2006.01)
*F04B 19/22* (2006.01)
*F04B 23/06* (2006.01)
*G01N 30/32* (2006.01)

(52) U.S. Cl.
CPC ............ *F04B 53/007* (2013.01); *F04B 53/02* (2013.01); *F04B 53/06* (2013.01); *G01N 2030/326* (2013.01)

(56) References Cited

U.S. PATENT DOCUMENTS

| | | |
|---|---|---|
| 3,847,507 A | 11/1974 | Sakiyama et al. |
| 5,393,434 A * | 2/1995 | Hutchins ............... F04B 7/0076 210/101 |
| 5,938,416 A * | 8/1999 | Saito ....................... F04B 23/06 417/199.1 |
| 6,478,547 B1 | 11/2002 | Savard et al. |
| 2004/0164013 A1* | 8/2004 | Takao ................. F04B 11/0075 210/198.2 |
| 2010/0089134 A1* | 4/2010 | Haertl ..................... F04B 53/14 73/61.55 |
| 2013/0340609 A1* | 12/2013 | Shreve .................... F04B 13/00 92/165 R |
| 2015/0345434 A1 | 12/2015 | Doebelin |

FOREIGN PATENT DOCUMENTS

| | | |
|---|---|---|
| EP | 0615126 A2 | 9/1994 |
| EP | 0615126 A3 | 9/1994 |
| JP | 10-159750 A | 6/1998 |
| WO | 2006/066996 A1 | 6/2006 |
| WO | 2012/122361 A2 | 9/2012 |
| WO | 2012/122361 A3 | 9/2012 |
| WO | 2015/150863 A1 | 10/2015 |

* cited by examiner

LIQUID CHROMATOGRAPHY PUMP HAVING DIVERSION CONDUIT FOR AIR EVACUATION

CROSS REFERENCE TO RELATED APPLICATIONS

This application claims priority to European Patent Application No. 16201217,3, filed Nov. 29,2016, the contents of which is incorporated herein by reference in entirety.

In liquid chromatography, a liquid solvent containing a sample mixture is pressed through a column filled with a solid adsorbent material, usually in granular form. Different flow rates of the different components through the adsorbent cause the components to be separated as they flow out the column. In high performance liquid chromatography (HPLC) pumping pressures are very high (50-400 bar), while in ultra high performance liquid chromatography (UPLC) pressures can be up to 1000-1400 bar. Also flow of samples through the column should be very constant and reproducible with high precision to avoid disturbance of measurements.

An HPLC instrument typically includes a sampler, a pump, a column and a detector. The sampler brings the sample mixture into the solvent (also called mobile phase or eluent) and the pump drives the mobile phase containing the sample through the column. The detector generates a signal proportional to the amount of sample component emerging from the column, so that a quantitative analysis of components present in the sample can be made.

Prior to operation, the pump heads of the pump need to be filled with eluent ('primed'). The process of doing so is referred to as 'priming'. There are various instances when (re)priming of a pump is required, for instance when air has been introduced into the low pressure flow path, when changing over to another solvent, solvent filter, low pressure tubing, etc., after a long period of inactivity (typically, this causes a build-up of air in tubing and possibly the solvent selection valve due to re-diffusion of oxygen and volatile components of the solvent may have gone lost) and after performing pump head maintenance.

Usually, a syringe is used to draw solvent into the inlet tubing and the pump head in order to prime the pump. The syringe is connected to a purge valve, downstream of the outlet of the pump head. By opening the purge valve the syringe is in connection with the outlet of the pump head and solvent can be drawn via the inlet tubing through the pump head into the syringe. After priming, the purge valve is closed and the pump is operated at regular flow rate for some time (e.g. 10 minutes) to remove any remaining air.

A problem often encountered after priming is that a significant amount of air remains in the pump or pumps, also after the pump has been operated, and disturbs the chromatography pressure and flow. In particular, air tends to remain near the seal and near the pressure sensor. Extended priming does not reduce the amount of air. Only during operation at >100 bar system pressure air dissolves over time and is carried away in dissolved condition. Though ultimately successful, such a method requires several minutes of pumping during which the takeover strokes will result in large pressure drops, potentially damaging the column. The use of a syringe, apart from being tedious, does not expedite the priming process.

From Japanese patent application H10-159750 and from U.S. patent application 2013/0340609, HPLC pumps are known in which a plunger extends through a seal into a pump chamber and is reciprocally movable in axial pumping directions. The pump head further has an inlet channel opening into the chamber at or near a first extreme end of the chamber and an outlet channel extending from the chamber at or near a second extreme end of the chamber axially opposite of the first end, thus providing a flow path for liquid in the pumping direction from the inlet channel to the outlet channel during priming. However, providing the inlet and outlet channels at opposite ends of the pump chamber conflicts with placement of check valves which, in view of the high operating pressures, are very large in relation to the pump chamber size.

SUMMARY OF THE INVENTION

It is an object of the present invention to provide an HPLC pump of which at least an inlet or outlet flow passes via an extreme end portion of the pump chamber to enhance evacuation of bubbles from the pump chamber, which has a very small internal volume and which can be manufactured efficiently.

According to the invention, this object is achieved by providing a high or ultra-high performance liquid chromatography pump including:
  a pump head bounding a pump chamber;
  a plunger passage opening into the pump chamber;
  a plunger rod extending in an axial direction into the pump chamber through the plunger passage, the plunger rod being reciprocally movable in the axial direction into the pump chamber and back;
  a plunger seal sealing off the plunger passage around the rod against fluidic leakage from the pump chamber;
  an outlet channel extending through the pump head from the pump chamber to an outlet port; and
  an inlet channel extending through the pump head from an inlet port to the pump chamber;
  wherein the pump head has a pump head block and a pressure sensor body, the pump head block and the pressure sensor body bounding portions of pump chamber axially adjacent to each other;
  wherein a tubular portion of the pump head block bounding a portion of the pump chamber projects into the pressure sensor body; and
  wherein the outlet channel has at least one diversion conduit portion at least partially bounded by the tubular portion of the pump head block, the diversion conduit portion of the outlet channel extending from the pump chamber in the axial direction.

By providing that the pump head has a pump head block and a pressure sensor body, the pump head block and the pressure sensor body bounding portions of pump chamber axially adjacent to each other, a tubular portion of the pump head block bounding a portion of the pump chamber projects into the pressure sensor body, and the outlet channel has at least one diversion conduit portion at least partially bounded by the tubular portion of the pump head block, the diversion conduit portion of the outlet channel extending from said pump chamber in said axial direction, the sensor body bounds an end portion of the pump chamber, which nevertheless has a very small volume when the output stroke is completed. Fluid flows out of the pump chamber from an extreme end portion of the pump chamber so that air is evacuated effectively. Since no separate sensor body is provided between the pump head and one of the check valves, the check valves can be positioned close to the pump chamber which allows a further limitation of the internal volume of the pump when the pump has completed an output stroke, even though, in view of the high operating pressures, the check valves are very large in relation to the pump chamber size. Also, the pump head can be manufactured more easily because the need of drilling the full length of the diversion conduit portion of the outlet channel is avoided.

The invention can also be embodied in a high or ultra high performance liquid chromatography pump including:
- a pump head bounding a pump chamber;
- a plunger passage opening into the pump chamber;
- a plunger rod extending in an axial direction into the pump chamber through the plunger passage, the plunger rod being reciprocally movable in the axial direction into the pump chamber and back;
- a plunger seal sealing off the plunger passage around the rod against fluidic leakage from the pump chamber;
- an outlet channel extending through the pump head from the pump chamber to an outlet port; and
- an inlet channel extending through the pump head from an inlet port to the pump chamber;
- wherein the inlet channel has a diversion conduit portion extending axially towards an inlet end of the pump chamber and opening into the pump chamber closely to the plunger passage in a direction oriented into an annular cavity of the plunger seal.

Because the inlet channel has a diversion conduit portion extending axially towards an inlet end of the pump chamber and opening into the pump chamber closely to the plunger passage in a direction oriented into an annular cavity of the plunger seal, air is effectively evacuated from the annular cavity of the plunger seal particularly effectively.

Further features, effects and details of the invention appear from the detailed description and the drawings.

DETAILED DESCRIPTION

Figure 1:
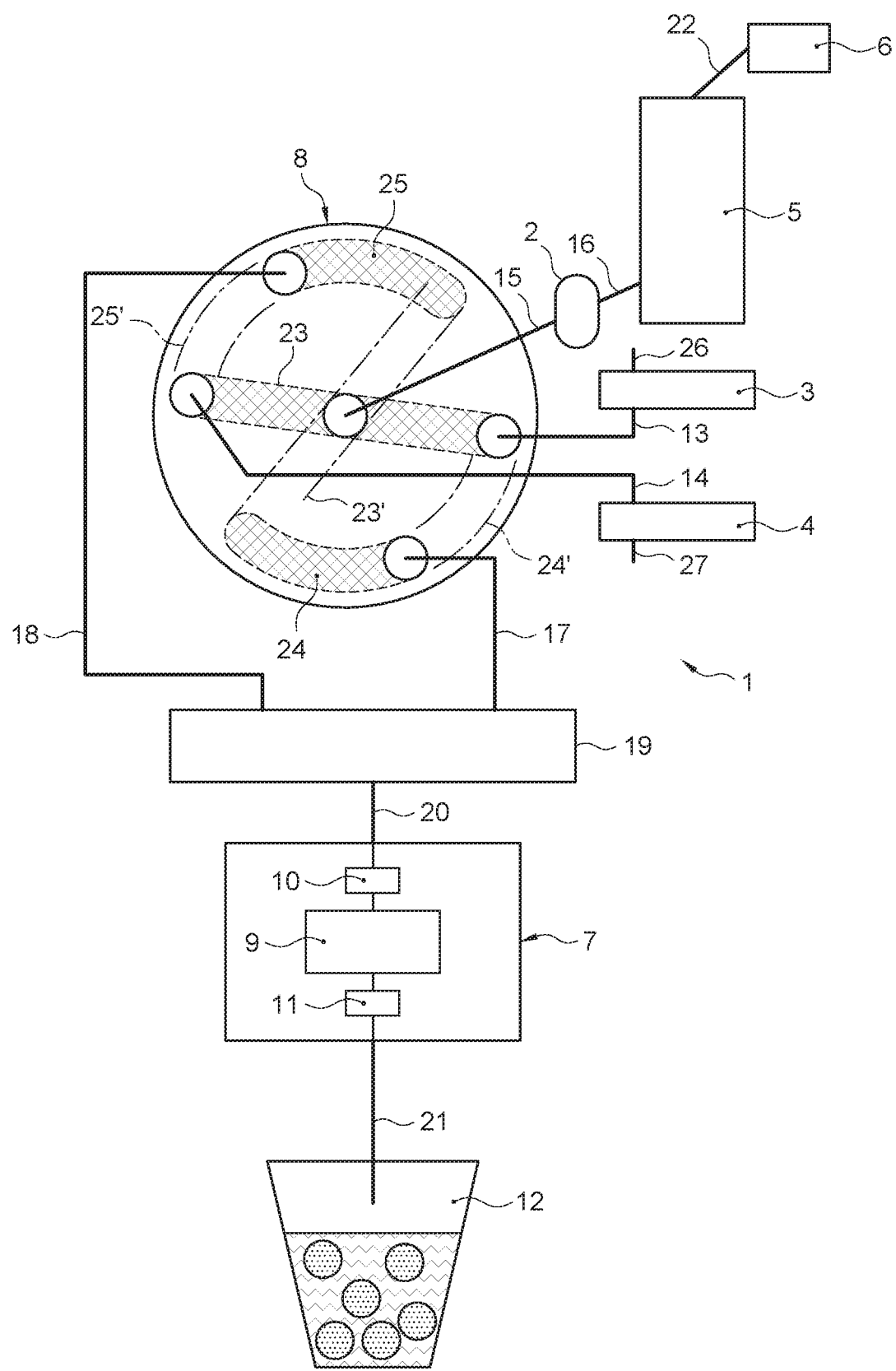
FIG. 1 is a schematic representation of an example of a high or ultra high performance liquid chromatography system including a pump and a pump system according to the invention.

In FIG. 1, a high or ultra-high performance liquid chromatography system 1 is shown, which includes a sampler 2, two pumps 3, 4, a column 5 and a detector 6. The system further has a priming pump 7, a priming valve 8 downstream of the liquid chromatography pumps 3, 4 for selectively causing the liquid chromatography pumps 3, 4 to communicate with either the liquid chromatography column 5 or the priming pump 7. The priming pump 7 has a variable volume priming pump chamber 9, a first priming check valve 10 upstream of the pump chamber 9 allowing fluid flow to the pump chamber 9 only and a second priming check valve 11 downstream of the pump chamber 9 allowing fluid flow away from the pump chamber 9 only. Downstream of the priming pump 7 a waste collecting receptacle 12 is arranged. The priming pump 7 may for instance be a diaphragm pump, movement of the diaphragm being driven by for instance an eccentric or a source of variating fluid pressure such as a pneumatic drive system.

The pumps 3, 4 communicate with the priming valve 8 via pump-valve channels 13, 14. A valve-sample channel 15 is for guiding eluent from the valve 8 to the sample in the sampler 2 and the sample-column channel 16 interconnects the sampler 2 and the column 5 for allowing the sample carried by the eluent to be passed to the column 5. Via a column-detector channel 22 separated components of the sample can pass from the column 5 to the detector 6. The priming valve 8 is shown in an operating condition in which the pumps 3, 4 communicate with the sampler 2 via a chromatography slot 23. By rotating a disc of the valve 8 to the left, priming slots 24, 25 are rotated to positions 24', 25' in which pump-valve channels 13, 14 communicate via the slots 24', 25' with priming channels 17, 18 respectively and the chromatography slot is in a position 23' in which it communicates with the valve-sample channel 15 only and is disconnected from the pump-valve channels 13, 14.

The priming channels 17, 18 are connected to a manifold 19, which is connected to the priming pump 7 via a manifold-pump channel 20. A discharge channel 21 leads from the priming pump 7 to the waste receptacle 12.

In operation, the sampler 2 brings the sample mixture into the solvent (also called mobile phase or eluent) and one of the pumps 3, 4 drives the mobile 30 phase containing the sample through the column 5. The detector 6 generates a signal proportional to the amount of sample component emerging from the column 5, so that a quantitative analysis of components present in the sample can be made.

Prior to operation, the pump head of at least one of the pumps 3, 4 needs to be filled with eluent ('primed'). The process of doing so is referred to as 'priming'. There are various instances when (re)priming of a pump is required, for instance when air has been introduced into a low pressure flow path 26, 27 (upstream of the pumps 3, 4), when changing over to another solvent, solvent filter, low pressure tubing, etc., after a long period of inactivity (typically, this causes a build-up of air in tubing and possibly the solvent selection valve due to re-diffusion of air and volatile components of the solvent may have gone lost) and after performing pump head maintenance.

By bringing the priming valve 8 in the priming position in which the priming pump 7 communicates with pumps 3, 4 via the priming valve 8, and activating the priming pump 7, enough solvent can be drawn through the pumps for completely filling the channels 26, 27 to the pump inlets, the pump heads of the pump 3, 4 and the channels 13, 14 to the priming valve. The priming pump 7 and the chromatography pumps 3, 4 may be in operation simultaneously to promote evacuation of air bubbles from the chromatography pumps 3, 4. Next, the priming valve is switched to the shown operating condition in which the pumps communicate with the column and the chromatography pumps 3, 4 are operated for some time (e.g. a few minutes), so that the system is purged and a stable flow rate and pressure is obtained.

Since a priming pump 7 is permanently arranged downstream of the priming valve 8, priming of the chromatography pumps 3, 4 can be carried out very efficiently. In particular, it obviates the need of coupling a syringe to the priming channel and uncoupling the syringe after priming. Also, the priming pump with check valves and a variable volume pump chamber between the check valves allows a fluid flow driven by the chromatography pumps through the priming pump while the priming pump is out of operation. Accordingly, also purging driven by the chromatography pumps can be carried out through the priming channels, so no separate purging channels are required and the priming valve can be of a relatively robust design without separate purging ports. These advantages are also achieved if the chromatography pump or pumps are not according to the present invention, e.g. of a conventional design, although the advantage of a reduced priming time is then not achieved.

An example of a pump of a particularly efficient design with little 'dead volume' at the end of each output stroke, which mitigates the problem that, after priming, a significant amount of air is left in the pump or pumps and disturbs the chromatography pressure and flow, is described with reference to an example of such a pump shown in FIG. 2. An example of implementation of such pumps in a system including a primary pump and a secondary pump in series therewith is described with reference to the example shown in FIG. 3.

Figure 2:
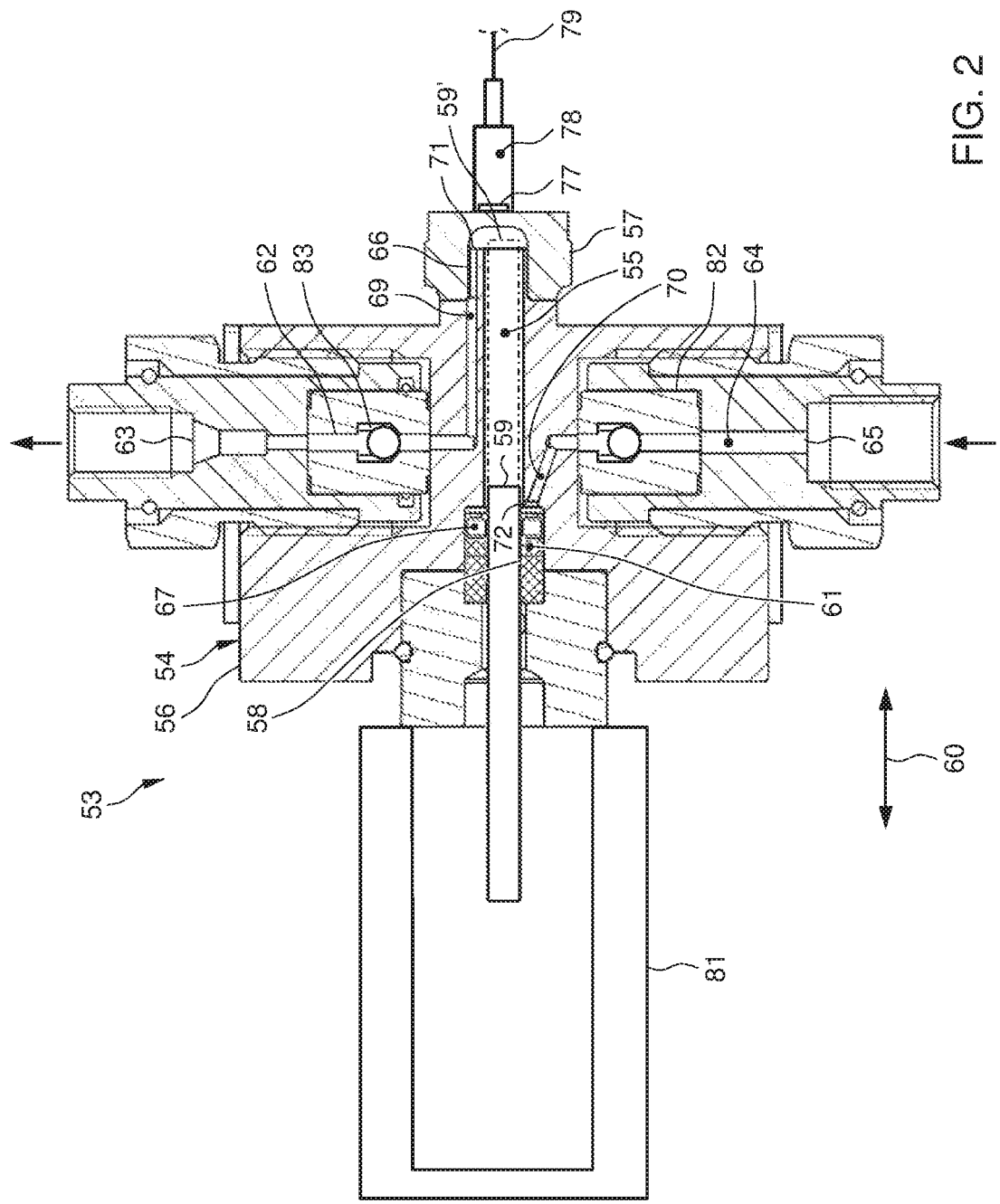
FIG. 2 is a schematic side view in cross-section of an example of a pump according to the invention.

The pump 53 shown in FIG. 2 has a pump head 54 bounding a pump chamber 55. The pump 53 is a primary pump with check valves 82, 83. A secondary pump version without check valves can also be provided. The pump head 54 has a pump head block 56 and a pressure sensor body 57 to which a pressure sensor (e.g. a strain gauge) 77 is mounted for measuring deformation of a relatively thin wall portion of the otherwise very stiff sensor body 57. The pressure sensor 77 is connected to sensor electronics 78 to which a signal output line 79 is connected. The pump head block 56 and the pressure sensor body 57 bounding portions of pump chamber 55 are axially adjacent to each other. A plunger passage 58 opens into the pump chamber 55 and a plunger rod 59 (see FIG. 2) extends in an axial direction 60 into the pump chamber 55 through the plunger passage 58. The plunger rod 59 is reciprocally movable in the axial direction 60 into the pump chamber 55 and back between a retracted position 59 and an extended position 59' (shown in dash-and-dot lines). A drive 81 for driving movement of the plunger may for instance be provided in the form of a linear motor as is known as such in HPLC and UPLC pumps.

A plunger seal 61 seals off the plunger passage 58 around the rod 59 against fluidic leakage from the pump chamber 55. An outlet channel 62 extends through the pump head 54 from the pump chamber 55 to an outlet port 63. An inlet channel 64 extends through the pump head 54 from an inlet port 65 to the pump chamber 55.

A tubular portion 66 of the pump head block 56 bounding a portion of the pump chamber 55 projects into the pressure sensor body 57. The outlet channel 62 has a diversion conduit portion 69 that is partially bounded by the tubular portion 66 of the pump head block 56. The diversion conduit portion 69 of the outlet channel 62 extends from the pump chamber 55 in the axial direction 60.

The inlet channel 64 has a diversion conduit 70 extending in the axial direction 60 to a conduit end 72 where the diversion conduit 70 opens into the pump chamber 55.

Since the sensor body 57 bounds an end portion of the pump chamber 55, there is no need for a sensor body and a chamber therein between the pump chamber and one of the check valves. The absence of a sensor body chamber upstream or downstream of the pump chamber facilitates evacuation of air and allows the inlet and outlet check valves 82, 83 to be positioned very close to the pump chamber 55 which reduces the internal ('dead') volume inside the pump 53 when the pump 53 has completed an output stroke. Moreover, because the pump head block 56 and the plunger in its end position 59' after completion of an output stroke project into the sensor body 57, the internal volume of the pump chamber 55 after completion of an output stroke is very small, which is moreover advantageous for effective evacuation of air, in particular since fluid flow through the pump chamber 55 is diverted via extreme end portions of the pump chamber 55. A small internal pump volume facilitates pump control towards a constant supply pressure, also because the amount of heat generated during compression and the volume of liquid temporarily warmed up during compression is reduced.

Nevertheless, the sensor body 57 can be made sufficiently large in axial direction to provide a main portion that is stiff enough to avoid an extent of deformation in use that would significantly disturb the deformation of the wall portion adjacent deformation sensor 77 on the basis of which pressure is measured. Also, welding or other connection of the sensor body 57 to the pump head block 56 is sufficiently far from the sensor 77 to avoid significant influence caused by deformation induced by the connection of the sensor body 57 to the pump head block 56. The pump head 54 can be manufactured more easily, because the need of drilling the full length of the diversion conduit portion 69 of the outlet channel 62 is avoided.

Manufacturing is further facilitated, because the diversion conduit portion 69 of the outlet channel 62 is at least partially formed by a channel in the tubular portion 66 of the pump head block 56 and, more in particular, this channel is formed in an outwardly facing circumferential surface of the tubular portion 66 of the pump head block 56 and open towards an inner wall surface of the pressure sensor body 57.

Although in the present example diversion conduits 70, 69 connected to, respectively, the inlet channel 64 and the outlet channel 62 have been provided, it is also possible to provide a diversion conduit of the inlet channel or the outlet channel only. Evacuation of air bubbles is then enhanced near one extreme end of the pumping chamber only. In particular if the other one of the inlet and outlet channels opens into the pump chamber near the opposite extreme end of the pump chamber, air evacuation is then also enhanced significantly.

For a particularly effective enhancement of air evacuation, it is, however preferred that the pump 53 has both a diversion conduit portion 70 of the inlet channel 64 extending axially towards an inlet end of the pump chamber 55 and a diversion conduit portion 69 of the outlet channel 62 extending axially from an outlet end portion of the pump chamber 55 opposite of the inlet end of the pump chamber 55.

For effective evacuation of air it is further generally preferable that at least one diversion conduit portion 69, 70 opens into the pump chamber 55 at a distance from an axial end of the pump chamber 55 that is smaller than 20%, and more preferably smaller than 10-15%, of the axial length of the pump chamber 55 and/or the diversion conduit portion 70 of the inlet channel 64 and diversion conduit portion 69 of the outlet channel 62 open into the pump chamber 55 at a mutual axial distance of at least 70%, and more preferably said mutual axial distance is at least 80-85%, of the axial length of the pump chamber 55.

The diversion conduit portion 70 of the inlet channel 64 is shorter in axial direction than the diversion conduit portion 69 of the outlet channel 62. Thus, the restriction upstream of the pump chamber 55 is relatively short, which reduces the risk of formation of air bubbles due to relatively low pressure during filling of the pump chamber. Moreover, this allows a wide portion of the pump head block 54 for accommodating the check valves to be compact in axial direction.

The diversion conduit portion 70 of the inlet channel 64 opens into the pump chamber 55 in an inlet position while a diversion conduit portion 69 of the outlet channel 62 opens into the pump chamber 55 in an outlet position. For effectively evacuating air, in particular in a fluid flow driven by reciprocating movement of the plunger rod 59, it is preferred that the inlet position is closer to the plunger passage 58 than the outlet position.

The diversion conduit portion 70 of the inlet channel 64 opens into the pump chamber 55 in a direction oriented into the annular cavity 67 of the plunger seal 61. This causes air to be evacuated from the annular cavity 67 of the plunger seal 61, where air bubbles tend to accumulate and stick, particularly effectively, so that disturbing effects of bubbles and dissolved air during the subsequent HPLC or UHPLC process is reduced.

Figure 3:
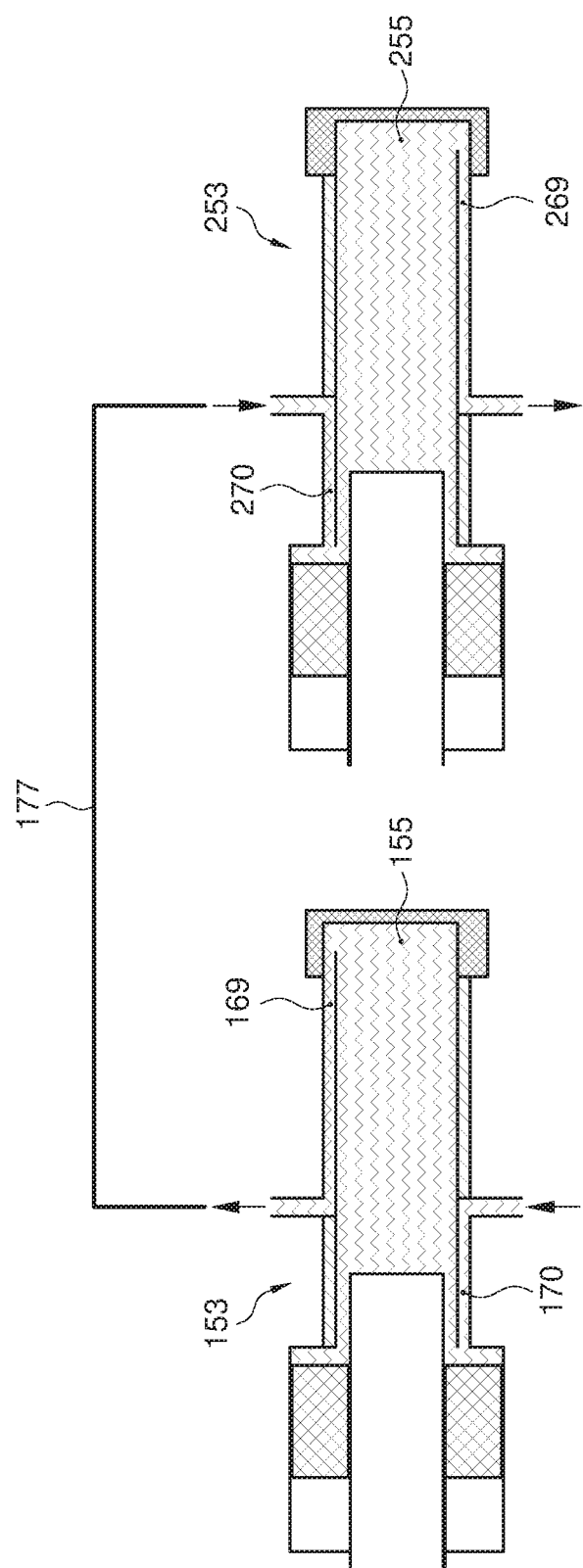
FIG. 3 is a schematic representation of an example of a pump system according to the invention including a primary pump and a secondary pump in series with the primary pump.

In FIG. 3, an example of a system according to the invention comprising a primary pump 153 communicating in series with a secondary pump 253 downstream of the primary pump 153 is shown. The primary pump 153 (check valves not shown) has an inlet diversion conduit 170 that opens into the pump chamber 155 in an inlet position at a vertically lower portion of the pump 5 chamber 155 while the outlet diversion conduit 169 opens into the pump chamber 155 in an outlet position at a vertically upper portion of the pump chamber 155. This has been found to be advantageous for an effective evacuation of air from the primary pump.

In the secondary pump, the outlet diversion conduit 269 opens into 10 the pump chamber in an outlet position in a vertically lower portion of the pump chamber 255 while the inlet position where the inlet diversion conduit 270 opens into the pump chamber 255 is in a vertically upper portion of the pump chamber 255. This has also been found to be advantageous for an effective evacuation of air from the primary pump.

The invention claimed is:

1. A high or ultra high performance liquid chromatography pump comprising:
 a pump head bounding a pump chamber;
 a plunger passage opening into the pump chamber;
 a plunger rod extending in an axial direction into said pump chamber through the plunger passage, the plunger rod being reciprocally movable in said axial direction into said pump chamber and back;
 a plunger seal sealing off the plunger passage around the plunger rod against fluidic leakage from the pump chamber;
 an outlet channel extending through the pump head from the pump chamber to an outlet port; and
 an inlet channel extending through the pump head from an inlet port to the pump chamber;
 wherein the inlet channel has a diversion conduit portion extending axially towards an inlet end of the pump chamber, and wherein said diversion conduit portion opens into the pump chamber in a direction oriented into an annular cavity of the plunger seal.

2. The pump according to claim 1, wherein a diversion conduit portion of the outlet channel extends axially from an outlet end portion of the pump chamber opposite of said inlet end of said pump chamber.

3. A pump system comprising the liquid chromatography pump according to claim 1, further comprising:
 a priming pump; and
 a priming valve downstream of the liquid chromatography pump for selectively causing the liquid chromatography pump to communicate with either a liquid chromatography column or the priming pump, the priming pump having a variable volume priming pump chamber, a first priming check valve upstream of the variable volume priming pump chamber allowing fluid flow to the variable volume priming pump chamber only and a second priming check valve downstream of the variable volume priming pump chamber allowing fluid flow away from the variable volume priming pump chamber only.

4. A high or ultra-high performance liquid chromatography pump comprising:
 a pump head bounding a pump chamber;
 a plunger passage opening into the pump chamber;
 a plunger rod extending in an axial direction into said pump chamber through the plunger passage, the plunger rod being reciprocally movable in said axial direction into said pump chamber and back;
 a plunger seal sealing off the plunger passage around the plunger rod against fluidic leakage from the pump chamber;
 an outlet channel extending through the pump head from the pump chamber to an outlet port; and
 an inlet channel extending through the pump head from an inlet port to the pump chamber;
 wherein the pump head has a pump head block and a pressure sensor body, the pump head block and the pressure sensor body bounding portions of the pump chamber axially adjacent to each other;
 wherein a tubular portion of the pump head block bounding a portion of the pump chamber projects into the pressure sensor body; and
 wherein the outlet channel has at least one diversion conduit portion at least partially bounded by the tubular portion of the pump head block, the diversion conduit portion of the outlet channel extending from said pump chamber in said axial direction.

5. The pump according to claim 4, wherein said at least one diversion conduit portion of said outlet channel is at least partially formed by a channel in the tubular portion of the pump head block.

6. The pump according to claim 5, wherein said channel is formed in a circumferential outer surface of the tubular portion of the pump head block and open towards an inner wall surface of the pressure sensor body.

7. The pump according to claim 6, further comprising a diversion conduit portion of the inlet channel extending axially towards an inlet end of the pump chamber and said diversion conduit portion of the outlet channel extending axially from an outlet end portion of the pump chamber opposite of said inlet end of said pump chamber, wherein said diversion conduit portion of the inlet channel is shorter in the axial direction than said at least one diversion conduit portion of the outlet channel.

8. The pump according to claim 4, further comprising a diversion conduit portion of the inlet channel extending axially towards an inlet end of the pump chamber and said diversion conduit portion of the outlet channel extending axially from an outlet end portion of the pump chamber opposite of said inlet end of said pump chamber.

9. The pump according to claim 8, wherein the pump chamber has an axial length and wherein the diversion conduit portion of the inlet channel and diversion conduit portion of the outlet channel open into the pump chamber at a mutual axial distance of at least 70% of the axial length of the pump chamber.

10. The pump according to claim 4, wherein the inlet channel has at least one diversion conduit portion, the at least one diversion conduit portion of the inlet channel opens into the pump chamber in an inlet position, the at least one diversion conduit portion of the outlet channel opens into the pump chamber in an outlet position, the inlet position being closer to the plunger passage than the outlet position.

11. The pump according to claim 10, wherein said at least one diversion conduit portion of the inlet channel is extending axially towards an inlet end of the pump chamber and said at least one diversion conduit portion of the outlet channel is extending axially from an outlet end portion of the pump chamber opposite of said inlet end of said pump chamber, wherein said at least one diversion conduit portion of the inlet channel opens into the pump chamber in a direction oriented into an annular cavity of the pump chamber extending along the plunger seal.

12. The pump according to claim 4, wherein the pump chamber has an axial length and wherein the at least one diversion conduit portion opens into the pump chamber at a distance from an axial end of the pump chamber that is smaller than 20% of the axial length of the pump chamber.

13. The pump according to claim 4, wherein the pressure sensor body has a wall portion bounding the pump chamber and wherein a deformation sensor for measuring deformation of said wall portion is mounted to said wall portion.

14. The pump according to claim 4, further comprising a pressure sensor mounted to the pressure sensor body.

15. The pump according to claim 14, wherein the pressure sensor includes a sensor for measuring deformation of at least a wall portion of the pressure sensor body, said wall portion being thinner than other wall portions of the pressure sensor body bounding the pump chamber.

16. A pump system comprising the pump according to claim 4, the pump being a primary pump communicating in series with a secondary pump downstream of the primary pump, wherein, of the primary pump, the inlet channel opens into the pump chamber in an inlet position, the outlet channel opens into the pump chamber in an outlet position, the inlet position being closer to the plunger passage than the outlet position.

17. A pump system comprising the pump according to claim 4, the pump being a secondary pump communicating in series with a primary pump upstream of the secondary pump, wherein, of the secondary pump, the inlet channel opens into the pump chamber in an inlet position, the outlet channel opens into the pump chamber in an outlet position, the inlet position being closer to the plunger passage than the outlet position.

* * * * *